United States Patent [19]
Gorgens

[11] 3,961,160
[45] June 1, 1976

[54] CARD READER
[75] Inventor: Richard A. Gorgens, Bedford, Mass.
[73] Assignee: Incoterm Corporation, Natick, Mass.
[22] Filed: Mar. 28, 1974
[21] Appl. No.: 455,928

[52] U.S. Cl. .................... 235/61.11 E; 235/61.7 B; 340/149 A; 250/569
[51] Int. Cl.² .................... G06K 7/14; G06K 19/06
[58] Field of Search ............ 235/61.11 E, 61.11 R, 235/61.11 D, 61.12 R, 61.12 N, 61.7 B; 179/15 BS; 250/569; 340/149 A

[56] References Cited
UNITED STATES PATENTS

| | | | |
|---|---|---|---|
| 3,184,581 | 5/1965 | Willoughby | 179/15 BS |
| 3,238,357 | 3/1966 | Minka | 235/61.11 E |
| 3,463,906 | 8/1969 | Chiang | 235/61.11 E |
| 3,474,232 | 10/1969 | Hearn | 235/61.11 E |
| 3,480,762 | 11/1969 | DelVecchio | 235/61.11 E |
| 3,627,990 | 12/1971 | Sallach | 235/61.11 E |
| 3,636,317 | 1/1972 | Torrey | 235/61.12 N |
| 3,663,800 | 5/1972 | Myer | 235/61.11 E |
| 3,852,572 | 12/1974 | Nicoud | 235/61.11 E |
| 3,858,032 | 12/1974 | Scantlin | 235/61.12 R |

Primary Examiner—Daryl W. Cook
Assistant Examiner—Robert M. Kilgore
Attorney, Agent, or Firm—Kenway & Jenney

[57] ABSTRACT

An apparatus for reading a digital data word stored on a manually inserted card. The card includes a digital data word comprising a plurality of encoded characters stored on the card in the form of a two dimensional data matrix.

The card reader includes a linear array of row data detection elements and an array of one or more rows of column data detection elements, each row being disposed perpendicular to the array of row data detection elements. As a card is inserted into the reader, the column data detection elements detect and store the data bits for each of the characters from the rows of the data matrix as those rows pass the column data detection element array. A circuit means coupled to the row and column data detection arrays identifies the detected column data with the corresponding rows of the data matrix which are currently overlying the column data detection array. Following full insertion of the card into the reader, the complete data matrix may be read out from the card reader memory.

24 Claims, 7 Drawing Figures

CARD READER

BACKGROUND OF THE INVENTION

This invention relates in general to semi-automated data acquisition systems and more particularly, to systems for reading digital data stored on cards.

Numerous forms of cards having digital data stored thereon are known in the art. Examples of such cards are credit cards having a customer account number, Hollerith encoded tab cards, and employee badges, which may typically include employee data such as employee number, shift number, and pay grade. The dimensions and data format of such badges are presently being standardized by the Credit Card Standard Committee of the American Standards Institute.

The digital data may be stored on such badges or cards in one of many forms. For example, raised areas on the badge or card may be used to denote a data bit (for use with mechanical reading systems employing static contacts). Such mechanical systems are, however, relatively unreliable in that the contact elements are subject to physical damage from repeated use. In other forms, the data words may be encoded by positioning an optically reflective area on the card in an appropriate field to represent a data bit (for use with optical reading systems employing light source and sensor configurations). Alternatively, a hole may be punched in the card in an appropriate field to represent a data bit (for use with optical reading systems employing a light source on one side of the card and a sensor element on the other side). Still other forms might include magnetically encoded data bits (for use with magnetic reading systems).

In each of these cases, the data stored by the card may include a multiple character data word in the form of a rectangular M row × N column data matrix with each row or column comprising an encoded character of the stored word. For example, a 10 digit decimal number may be encoded by a 10 × 10 data matrix wherein the binary words formed by the 10 bits of the columns are representative of the correspondingly positioned digits or characters of the data word.

Generally, readers for such cards include an array of data detection elements with the individual elements disposed at locations corresponding to the bit locations of the data matrix on the card to be read. When a card is inserted in the card reader and maintained at a fixed position with the data matrix aligned with the detection element array, a reading operation may take place. Thus, in such systems, the detection element array includes a data detection element for each potential bit in the data matrix, e.g. where the data matrix includes ten characters, each having ten bits, 100 detection elements are required to detect the data word. In addition, the card reader must include means for maintaining the card in a position aligning the data matrix with the detection element array for a duration sufficient for reading.

A card reader which provides a detection array of substantially fewer detection elements than there are bit positions in the data matrix, as well as means for determining the orientation of the card is described in the U.S. Pat. application entitled "Card Reader", Ser. No. 455,929, filed Mar. 28, 1974, by Edward Sonier and assigned to the assignee of the present invention.

SUMMARY OF THE INVENTION

It is an object of this invention to provide a card reader in which reading of a card may be accomplished during the period of insertion of a card into the reader.

Another object is to provide a system for reading digital data stored on cards in a binary data matrix in which the card reader includes an array of column detection elements for sequentially reading predetermined groups of rows of the data matrix, and includes only a further linear array of row or group detection elements for identifying the groups of rows of the data matrix currently being read.

In accordance with the present invention, an apparatus is provided for reading a digital data word stored on a card having information stored on the card in the form of a two dimensional data matrix. Each column or row of the data matrix may include a binary data word representative of one of the encoded characters.

The card reader apparatus includes a guide means for controlling the orientation of a card inserted therein. In addition, the card reader includes an array of one or more rows of column data detection elements having its rows perpendicular to the direction of insertion of the card, with the number and spacing of the column elements in each row corresponding to the number and spacing of the columns in the data matrix of a card. The array of column elements is disposed so that the individual column elements are aligned with the corresponding columns of the data matrix when a card is inserted in the card reader with a predetermined orientation. The card reader also includes a linear array of row or group data detection elements extending in the direction of insertion of the card, with the number and spacing of these elements being related to the number and spacing of the rows in the data matrix of a card. Each row or group data detection element is uniquely associated with a predetermined group of rows of the data matrix. The product of the number of elements in the linear row or group array with the number of rows in the column array is equal to or greater than the number of rows of the data matrix. The spacing between the rows of detection elements in the column array is equal to the spacing between the rows of the data matrix multiplied by the ratio of the number of rows in the data matrix to the number of rows in the column array. The array of row or group elements is disposed so that as a card is inserted in the reader, the leading edge of the card is detected by the individual element associated with the group or rows of the data matrix currently aligned with the column data detection element array.

As a card is inserted into the card reader, the column data is detected and stored for each group of rows of the data matrix as the rows overlie the column data detection element array. Following full insertion of a card into the reader, the complete data matrix may be read out from the card reader memory.

BRIEF DESCRIPTION OF THE DRAWINGS

The invention itself will be more fully understood from the following description, when read together with the accompanying drawings in which.

DESCRIPTION OF THE PREFERRED EMBODIMENT

Figure 1:
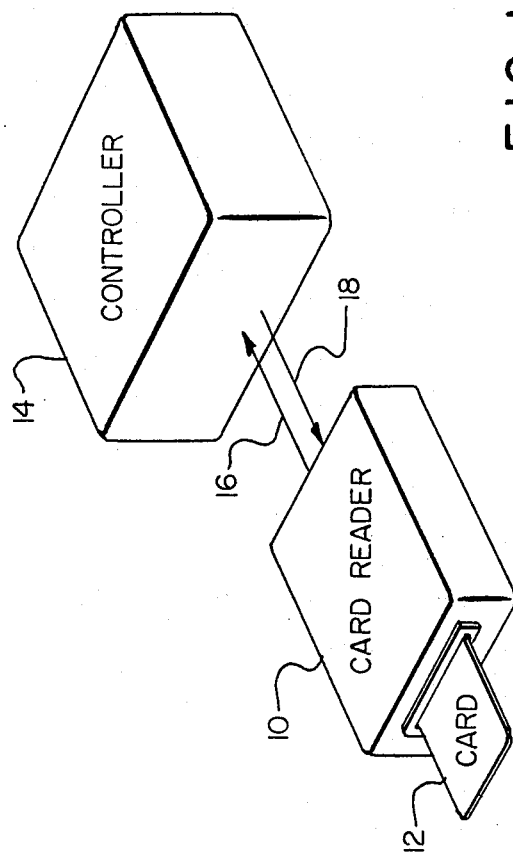
FIG. 1 shows a card reading system in accordance with the present invention.

FIG. 1 shows a card reader 10, together with a card-to-be-read 12 and an external controller 14 which is connected to reader 10 by signal lines 16 and 18. The card reader 10 of the present embodiment is an optical system for use with cards having a data word stored on it in the form of transparent areas such as punched holes. The encoded information is detected by a plurality of data detection elements, each including an optical source and sensor. Alternative embodiments may accommodate cards having data in other forms e.g. raised areas on the card (using mechanical contact elements for data detection), reflective areas on the card (using optical sources and sensors on a first side of the card for data detection), or magnetically encoded regions on a magnetic medium on the card (using magnetic sensors for data detection).

Figure 2:
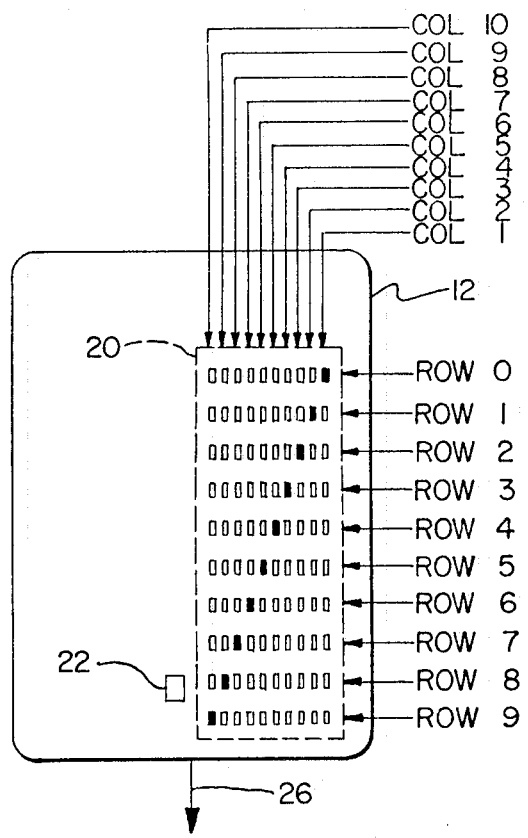
FIG. 2 shows an exemplary card for use with the system of FIG. 1.

FIG. 2 shows a card 10 suitable for use with the present embodiment. Card 10 is an American Standards Institute Type 5 card which may also be used as a Data Collection Badge for IBM 357 and 1030 Badge Readers. In the top view of the card shown in FIG. 2, the data is encoded in 10 rows and 10 columns of data positions, each characterized by one or the other of two states. The data are stored in a 10 × 10 data matrix 20, with each column being representative of a character word. In FIG. 2, the data matrix 20 is shown with rectangles representing data bit locations. The shaded rectangles are representative of punched holes and the remaining rectangles are representative of unpunched holes. Each character word includes a single hole punched in one of the rows with all other rows having no hole punched. Each column may represent one of the 10 digits (0–9) with the row of the punched hole determining the digit value of the character word. Thus, the card in FIG. 2 has encoded on it the number 0123456789.

The card 10 also includes a pawl hole which is offset laterally from the center line of the card in the embodiment of FIG. 2. The pawl hole 22 on the card 12 is used in prior art card readers in conjunction with mechanical means to restrain the badge in the reading position until the read operation is accomplished. However, systems configured in accordance with the present invention require no such restraining since the reading operation is accomplished as the badge is inserted in the card reader, and thus is complete by the time the badge is fully inserted in the reader 10. As described below, this feature permits a detection operation to determine whether a card has been inserted in the proper orientation for a valid reading operation.

Figure 3:
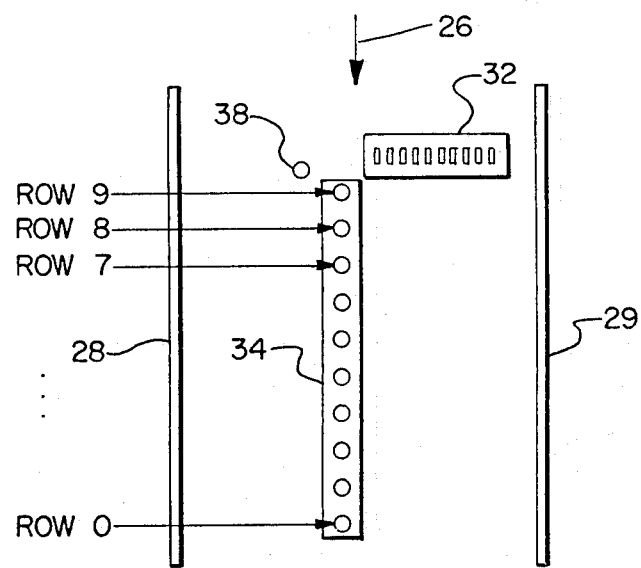
FIG. 3 shows a source/sensor arrangement for reading the card of FIG. 2.

FIG. 3 shows the top view of an optical source/sensor configuration for use with the card of FIG. 2. The card reader 10 includes identical arrays of light sources and sensors so that each sensor is aligned with an associated light source. It will be understood that the card-to-be-read is inserted into the card reader 10 in the direction indicated by arrow 26 in FIGS. 2 and 3, and between the source arrays and the sensor arrays. The card reader 10 includes guide means 28 and 29 to ensure that the card 10 may only be moved in the direction of insertion and may not be moved transverse to that direction. Of course, the card may be removed by a motion in the opposite direction to that motion in the insertion operation.

The source/sensor configuration includes a linear array of column data detection elements 32 comprising a plurality of optical source/sensor pairs, wherein each source/sensor pair is positioned to correspond to a column location of the data matrix on the card 12. Accordingly, for a matrix with N columns, there are N detection elements 32. The source/sensor configuration further includes a linear array of row data detection elements 34 comprising a source/sensor pair associated with each of the rows of the data matrix 20 of card 12, (again, if there are M rows, there are M source/sensor pairs). Each sensor of array 34 is positioned so that it senses the leading edge of a card 12 when the associated row of data matrix 20 is aligned with the source/sensor pairs of the column data detection array 32. The elements of row data detection array 34 are further positioned so that the pawl hole 22 is aligned with and passes over that array as the card 20 is inserted into the card reader 10.

In addition to the arrays 32 and 34, a "no badge" source/sensor pair 38 is arranged to provide a signal whenever a badge is inserted into reader 10. It will be understood that the no badge source/sensor pair 38 is positioned appropriately so that false readings may not occur due to the other data holes punched in the card 12.

In operation, as a card or badge 12 is manually inserted into reader 10 from the direction 26, a "badge present" signal is generated by the source/sensor pair 38 and as the badge is further inserted into reader 10, the light from row 9 source to the associated sensor is intercepted by the leading edge of the inserted card. At this point, the row 9 of the data matrix 20 on the card 12 is aligned with the column data detection array 32. The sensor elements of the column data detection array 32 are successively sampled to detect and store signals indicative of the presence or absence of holes (representative of binary "ones" or "zeros") in the corresponding bit positions in the row 9 of data matrix 20. As the card continues to be inserted further into reader 10, the light passing from the row 8 source to its sensor in array 34 is intercepted by the leading edge of card 12 at the point where row 8 of the data matrix is aligned with column sensor array 32. The sensor elements of the column data detection array 32 are again successively sampled to detect and store signals indicative of the presence or absence of holes in corresponding bit positions in the row 8 of the word matrix 20. This operation continues for the successive rows of data matrix 20 as the card 12 is inserted further into reader 10. In this manner, the rows of the data matrix 20 of card 12 are successively read during the insertion operation of the card into reader 10 so that upon full insertion of the card 12, the entire data word stored on card 12 had been read from the data matrix 20 and stored in reader 10. The external controller 14 may interrogate reader 10 (via lines 16 and 18) to acquire the data word read from card 12 for subsequent operations on this data word. It will be understood that in an alternative embodiment, the card reader 10 reads the data word on card 12 in the same manner described above during the extraction of the card from the card reader 10 and a parity check may be performed to eliminate potential detection errors in the detection operations.

Figure 4:
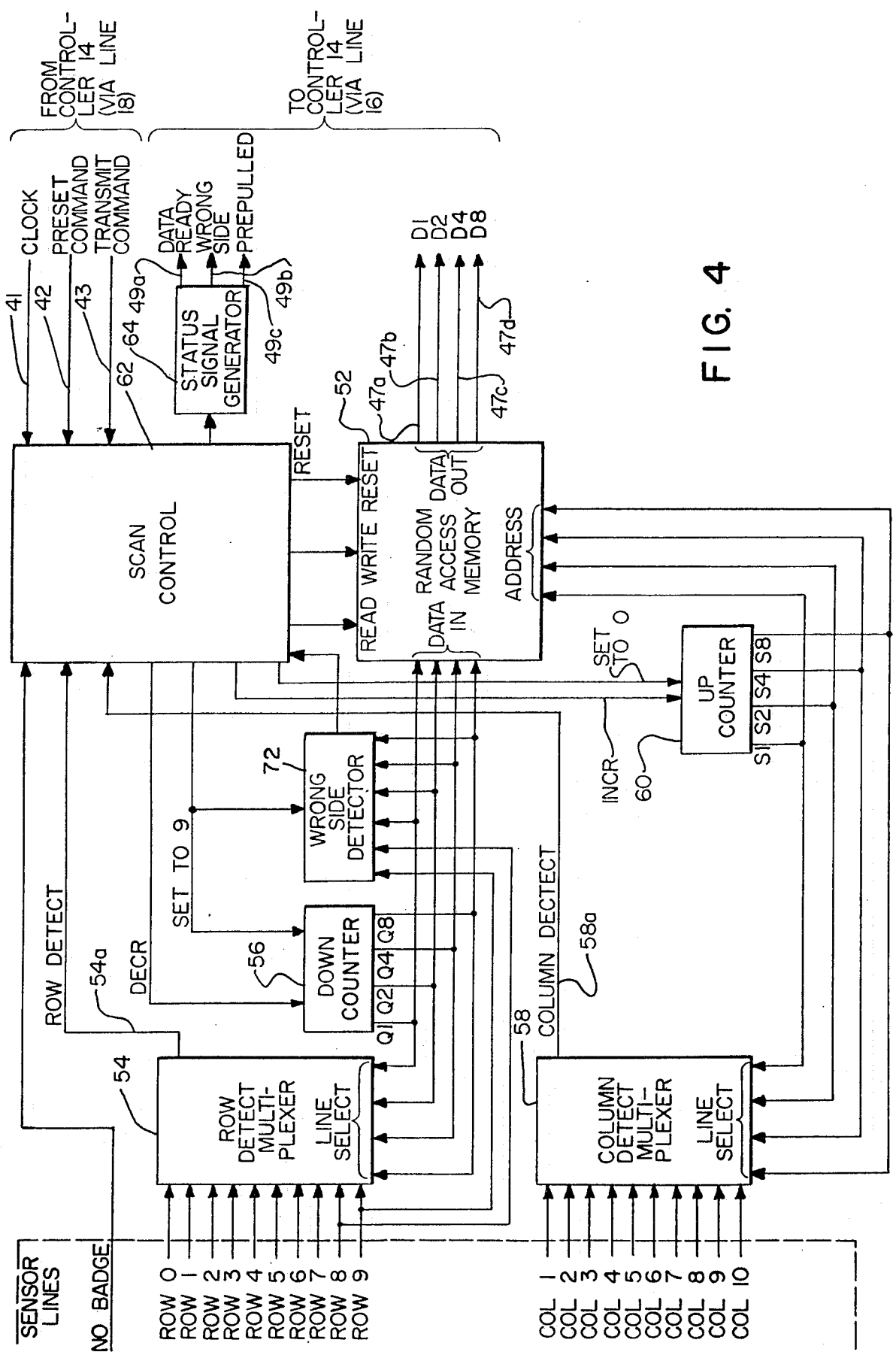
FIG. 4 shows in block diagram form, card reader control logic for the arrangement of FIG. 3.

FIG. 4 shows an exemplary configuration for the card reader control logic for reading the card 12. The row 0–9 input lines of FIG. 4 are connected to the corresponding row data detection sensors in FIG. 3, the column 1–10 lines are connected to the corresponding column data detection sensors in FIG. 3, and the NO BADGE line is connected to the no badge sensor in FIG. 3. In this embodiment, a hole in an inserted card which is between one of the above-mentioned sensors and its associated light source or the absence of a card (permitting light to pass between the source and sensor) places a binary one on the associated line. When no light passes between a source and its associated sensor, a binary zero is placed on the associated line.

The card reader control logic of FIG. 4 is responsive to a controller 14 which is not a part of the present invention. This controller provides the card 10 with a clock signal on line 41, a preset command signal on line 42 and a transmit command signal on line 43. The card reader 10 provides the controller 14 with a four bit data word in lines 47a–d and control signals on lines 49a–c. Lines 41, 42, 43 and 47a–d, 49a–c, are collectively represented in FIG. 1 by lines 18 and 16, respectively.

The card reader may have an alternative embodiment having no external controller 14, but wherein a manual control is provided, which produces the preset command, transmit command and clock signals for reader 10 and in which reader 10 includes a read-out means for displaying the data signal and control signals on lines 47a–d and 49a–c, respectively.

The card reader 10 includes, in addition to the source/sensor pairs described above in conjunction with FIG. 3, a 4 × 10 bit random access memory 52, a row multiplexer 54, down-counter 56, column multiplexer 58, up-counter 60, scan control 62 and status signal generator 64.

As shown in FIG. 4, the down-counter 56 provides signals representative of its count state (Q1Q2Q4Q8) to the line select inputs of row detect multiplexer 54 and to the data inputs of the memory 52. The count state of down-counter 56 is representative of the number of the current row of the data matrix 20 which is aligned with the array of column data detection elements 32.

The up-counter 60 provides signals representative of its count state (S1S2S4S8) to the line select inputs of multiplexer 58 and to the address inputs of memory 52. The count state of up-counter 60 is representative of the number of the currently sampled column data detection element of array 32 during a scan of a row of data matrix 20. Multiplexers 54 and 58 provide row detect signals (on line 54a) and column detect signals (on line 58a) respectively, to the scan control 62.

Status signal generator 64 includes three registers. The first register provides a binary 1 signal on line 49a when a card reading operation is complete, denoting a DATA READY condition. The second register provides a binary 1 control signal on line 49b, denoting a WRONG SIDE condition, when scan control 62 has determined that the card has been inserted in reader 10 with the "wrong side" up or "wrong end first". The third register provides a binary 1 control signal on line 49c, denoting a PREPULLED condition, when control 62 indicates that the card being read has been removed from reader 10 prior to full insertion of the card.

In operation, the external controller 14 may activate card reader 10 for reading a card by applying a clock signal on line 41 and a preset command signal on line 42. In response to the preset command signal, scan control 62 generates control signals which set the down-counter 56 to the count 9 state, set the up-counter 60 to the count 0 state, reset the status signal registers in generator 64 to place binary 0 signals on lines 49a–c and load the memory 52 (via the RESET line) to a predetermined state (e.g. all binary 1's).

The card reader 10 remains in this NO BADGE state until a card 12 is inserted. In reponse to a card 12 being inserted between the no badge source and sensor pair 38, the no badge sensor 38 provides a control signal on the NO BADGE line input to scan control 62. This control signal, generated when a card is present, maintains the card reader 10 in its operative state until the card is removed (whereupon reader 10 returns to the NO BADGE state). As the card is inserted further into reader 10, the leading edge of the card next passes the row 9 source/sensor of the row data detection array 34. In response, the Row 9 line provides a binary one signal to multiplexer 54. Since the down-counter 56 is in the count 9 state (as indicated above), the binary one on the Row 9 input line to multiplexer 54 is transferred to the row detect output line 54a and applied to scan control 62. This condition indicates to scan control 62 that the row 9 of the data matrix 20 on the card 12 is aligned with the scan column data detection array 32. At this time, a scan cycle is initiated by scan control 62.

In the scan cycle, each element in the column data detection array 32 is sequentially read out to determine which information positions in each row have a binary 1 value. This is accomplished by incrementing a modulo ten counter 60 to provide that the ten 4 bit locations in memory 52 are sequentially addressed as the multiplexer 58 sequentially connects each of the elements in column data detection array 32 via the column detect line to the scan control 62. In response to the detection of a binary 1 value on the column detect line, this scan control 62 applies a write signal to the write input of the memory 52, thereby causing the storage of a signal representative of the count state of down-counter 56 (Q1Q2Q4Q8) at the correctly addressed location of memory 52.

As noted above, the up-counter 60 is initially set to the count zero state and thus, the data bit on the Column 1 input line of multiplexer 58 is first transferred via the column detect line 58a to scan control 62. If the signal applied by the column detect line 58a to control 62 is a binary one (indicating that column one includes a hole punched at the current row), then scan control 62 applies a write signal to memory 52 and the state of counter 56 (Q1Q2Q4Q8) is stored at the addressed location corresponding to the state of counter 60 (S1S2S4S8). Since there can be a maximum of one hole punched per column in the card 12 in the presently described embodiment, the memory 52 stores a four bit signal representative of the state of counter 60 as the column 1 character. (It will be understood that other embodiments may utilize different coding in the data matrix wherein more than one hole per column may be present, or, alternatively, where the characters are encoded in the row bits, with each row representing a different character).

Following the write operation, (or if no write operation is performed because the column 1 line does not indicate a hole in the bit position of the current row), the counter 60 is incremented by control 62 and the column 2 signal is then applied via the column detect line 58a to control 62 and the above process is repeated for writing the words in memory 52 (or not writing when no hole is present). This cycle is repetitively performed for each of the remaining 8 column lines to multiplexer 58. Following the scanning of the column 10 (or last) input line to multiplexer 58, the down-counter 56 is decremented by one unit to the count 8 state and the up-counter 60 is reset to the count zero state.

In response to the setting of down-counter 56 to the count 8 state, the data from the Row 8 sensor line is applied by the row detect multiplexer 54 and the row detect line 54a to the scan control 62. As the card 12 travels farther into the reader 10, the leading edge will intercept light passing between the row 8 source and sensor pair and, accordingly, a binary one signal is applied via the Row 8 line, multiplexer 54, and line 54a to scan control 62. In response, another scan cycle is initiated, and the above described operation is repeated. As the card 12 travels still farther into reader 12, the successive row source/sensor pairs are intercepted by the leading edge of the card 12 and the entire scan process is repetitively performed for each row. Following the termination of the Row 0 scan cycle, the data ready register of the status generator 64 is set to provide a binary 1 control signal on line 49a, indicating that the card 12 has been fully read.

The inserted card 12 is read to completion unless either of the following two error conditions are encountered:

1. the card was inserted with the wrong side up or the wrong end first (so that the data matrix 20 is not aligned with the column array 32), or
2. the card was removed prior to scanning, detecting and storing data from the last row, Row 0.

The first error condition, denoted WRONG SIDE condition, is detected by the wrong side detector 72. To do so, detector 72 determines if, during the time when down-counter 56 is in the count 8 state, both Row 8 and Row 9 lines indicate that the card 12 is blocking the light from the source to both corresponding sensors. If so, then the card is either upside down, or inserted with its wrong end first since the pawl hole 22 would normally provide a binary 0 on the row 9 line at this point in time during the count 8 state of counter 56. In response thereto, detector 72 applies a control signal to scan control 62 which in turn, sets the corresponding register in status signal generator 64, and applies an appropriate control signal on line 49b.

The second error condition, denoted PREPULLED condition, is determined by detecting when the NO BADGE line returns to its initial state (indicating that card 12 has been removed from reader 10) prior to the detection of and scanning of row 0. This detection operation is provided by scan control 62 and in response thereto, the corresponding register in status signal generator 64 is set so that an appropriate control signal is provided on line 49c. It will be understood that the card must be removed almost completely from reader 10 before this PREPULLED error condition can occur. In such case, the reinsertion of the badge would cause the complete re-reading of the full data matrix 20. As a result of this latter error condition feature, the card reader 10 may accommodate a condition where the badge is "teased" into reader 10 without detrimental effects on the reading of the data due to the fact that once any row is detected and scanned, the presence or absence of the row signal has no effect on subsequent row detection.

It will be understood that if a scan operation is interrupted by the partial prepulling of a card without complete withdrawal of the card, that scan operation may be re-initiated upon the insertion of the card to the appropriate position to generate a row detect signal.

The time required to scan any row is dependent upon the frequency of the clock signal provided by the external control 14, or in other embodiments, by the internally generated clock signal. For the presently described embodiment, at a clock rate as low as 1 KHz, the scan time for one row is on the order of 20 milliseconds, which is a fraction of the time that the holes in that row are positioned over the columns sensors.

Once the reading of the card has been completed, and the data ready signal is applied on line 49a, the data stored in memory 52 may be transferred via lines 47a–d to the external controller 14 or to a separate read-out unit in response to a transmit command applied on line 43. The read-out rate of the succession of characters on lines 47a–d is determined by the clock signal applied by the external controller since the scan control 62 increments up-counter 60 to provide the successive addressing operations within memory 52.

Accordingly, the above-described exemplary configuration provides a badge reader for American Standards Institute type 5 badges wherein only 21 source/sensor elements are required to read a 10 × 10 data word matrix (compared with at least 100 required by badge readers of the prior art). In addition, the card reader described above employs no moving parts since the badge motion is provided by the operator who inserts the badge, and since no pawl retention is required. It will be further understood that the above-described system thereby becomes virtually independent of insertion speed.

Figure 5:
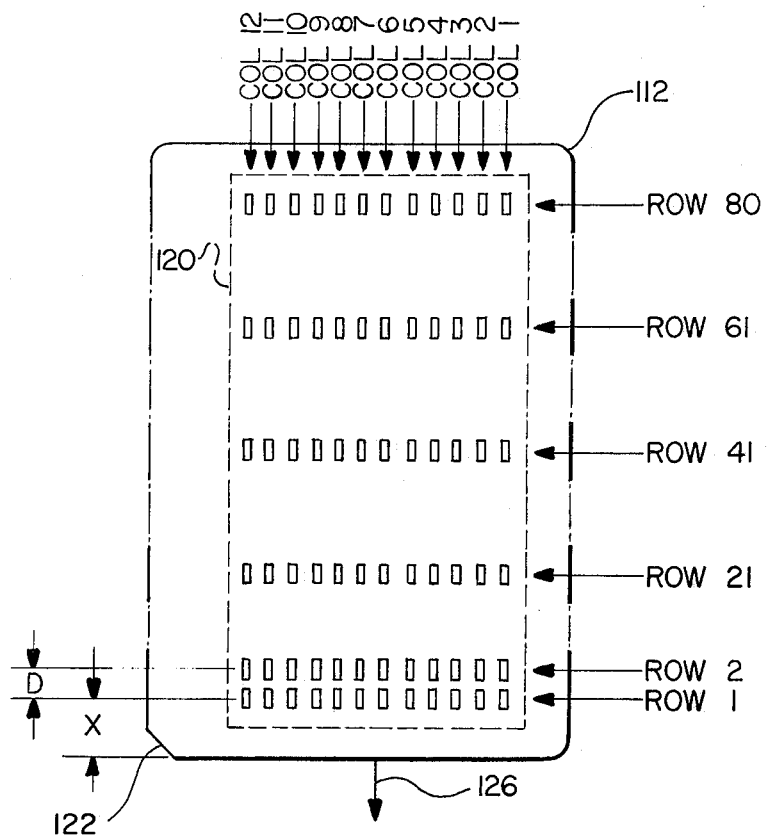
FIG. 5 shows an alternative form of an exemplary card for use with the system of FIG. 1.

In an alternative embodiment, a card reader may be configured to read an 80 row (12 bits per row) Hollerith encoded tab card. Such an embodiment may also be configured generally as shown in FIG. 1 with an external controller 14 interconnected with a card reader 10 via control lines 16 and 18. In the following description, the Hollerith card reader is denoted as card reader 110 (as distinguished from the card reader 10 described above in conjunction with FIGS. 2–4) for reading a data card 112 having the format shown in FIG. 5. Card 112 includes a data matrix 120 having an 80 row, 12 column field for data bit locations. Each row may contain a Hollerith encoded data word consisting of punched holes at the appropriate locations. The separation between rows is uniform and is referred to in FIG. 5 by "D". Row 1 is shown to be a distance denoted "X" from a first edge of card 112. A corner cut portion 122 is located near the row 1, column 12 data position. For the card reader 110, the direction of insertion of card 112 is indicated by the arrow 126. It will be understood that the row and column notation and orientation of the data bit locations of the card shown in FIG. 5 is merely exemplary and that, for example, the date matrix may alternatively be defined as having 80 columns with 12 rows, and have the data bit locations oriented perpendicular to those shown in FIG. 5.

Figure 6:
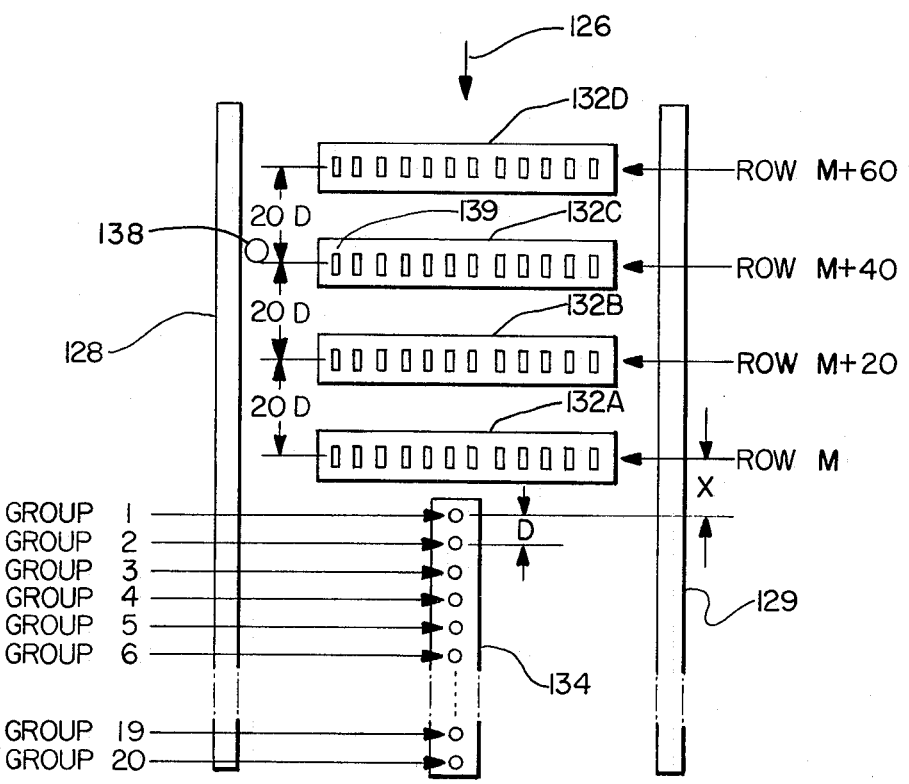
FIG. 6 shows a source/sensor arrangement for reading the card of FIG. 5.
Figure 7:
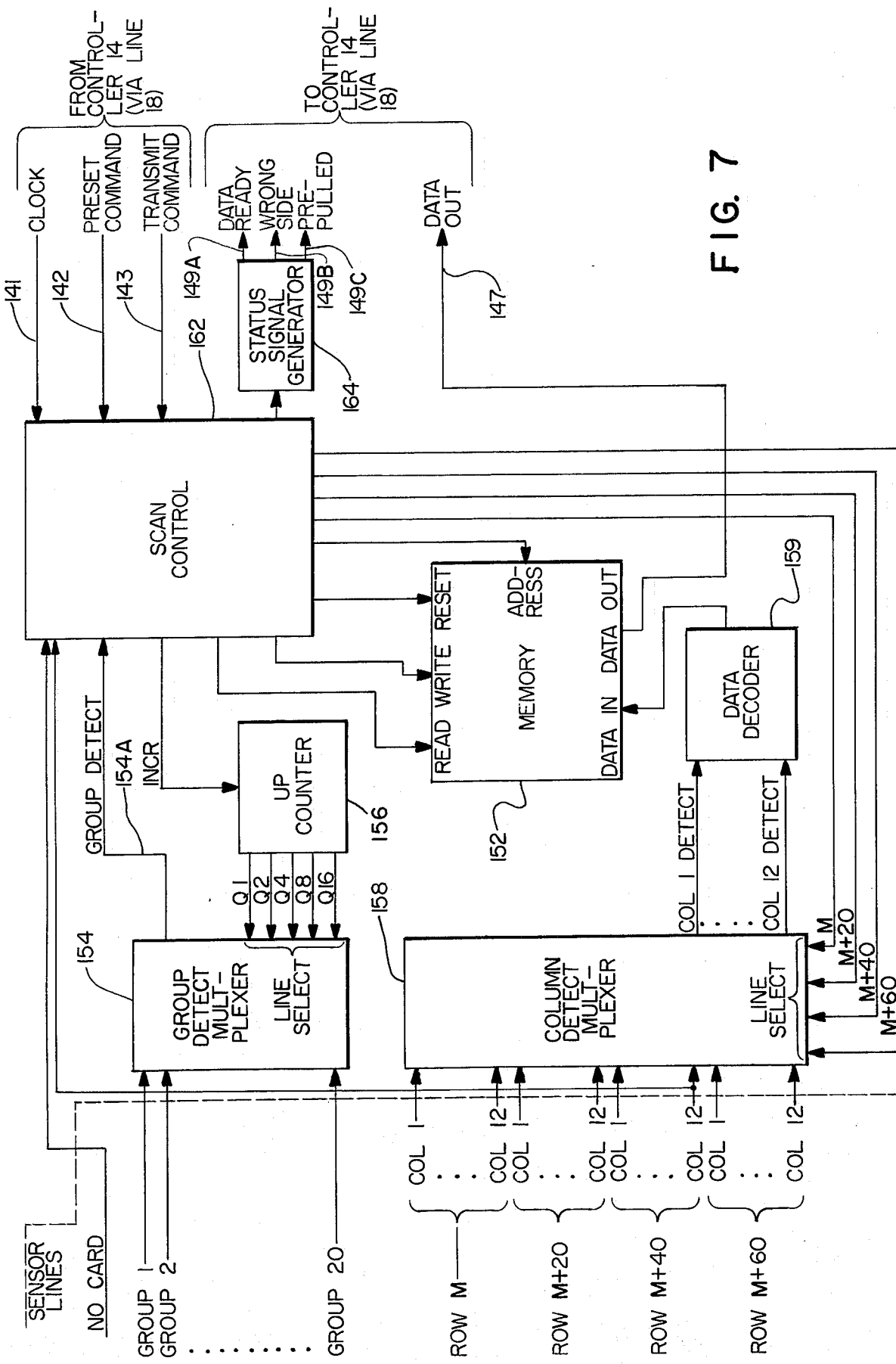
FIG. 7 shows in block diagram form, card reader control logic for the arrangement of FIG. 6.

FIGS. 6 and 7 show the source/sensor configuration and control logic, respectively, for the card reader 110. The elements of card reader 110 which correspond to similar elements of the card reader 10 are denoted by reference numerals having identical units and tens digits as the corresponding elements of reader 10.

The card reader 110 may be responsive to a controller 14 which provides a clock signal, a preset command signal and a transmit command signal via lines 141, 142, and 143, respectively, in the same manner as the controller described in conjunction with FIG. 4. Similarly, the card reader 110 provides the controller 14 with a data signal on line 147 and control signals on line 149A–C. Lines 141–143 and 147, 149A–C, are collectively represented in FIG. 1 by lines 18 and 16, respectively. Alternatively, the card reader 110 may be embodied with no external controller 14, but wherein an internal clock generator and data display system is utilized.

FIG. 6 shows the top view of an optical source/sensor configuration for use with the card 112. The card reader 110 includes identical arrays of light sources and sensors so that each sensor is aligned with an associated light source. The card-to-be-read is inserted into the card reader 110 (in the direction indicated by arrow 126 in FIGS. 5 and 6) between the source arrays and the sensor arrays.

The card reader 110 further includes guide means 128 and 129 to ensure that the card 110 may only be moved in the direction of insertion and may not be moved transverse to that direction. Of course, the card may be removed by a motion in the opposite direction to that motion in the insertion operation.

The source/sensor configuration of FIG. 6 includes four linear arrays of column data detection elements 132A–D, each having 12 source/sensor pairs with each pair being positioned to correspond to a column location of the data matrix 120 on the card 112. The source/sensor configuration further includes a linear array of group data detection elements 134 positioned substantially perpendicular to the column data detection arrays 132A–D. The group array 134 has 20 source/sensor pairs with each pair being associated with a predetermined set of four rows of the data matrix 120 of card 112. Each such set of four rows is designated a group. Each of the 20 groups includes row M, row M+20, row M+40 and row M+60, where M is an integer ranging from 1 to 20, and thus, the value M is an identifier for each group.

The column data detection arrays 132A–D are separated by a distance 20×D, i.e. 20 times the separation of adjacent rows of the data matrix 120 so that the array 132A is associated with the Mth row, the array 132B is associated with the M+20th row, the array 132C is associated with the M+40th row, and the array 132D is associated with the M+60th row.

In addition, each of the 20 source/sensor pairs in the group detector array 134 is separated from the adjacent element by a distance D and the center line of the group 1 source/sensor pair is separated from the center line of the column data detector 132A by a distance X. Consequently, each the Mth or Group M source/sensor pair of array 134 is positioned so that it senses the leading edge of card 112 when the associated set of four rows of data matrix 120 (i.e. row M, row M+20, row M+40 and M+60) is aligned with source/sensor pairs of the column data detection arrays 132A–D. For example, when the edge of card 112 first passes over the group 1 detector element, rows 1, 21, 41 and 61 are aligned with the detection arrays 132A, 132B, 132C and 132D, respectively. Similarly, when the edge of card 112 passes over the group 20 detection element of array 134, rows 20, 40, 60 and 80 are aligned with the respective ones of arrays 132A–D.

In addition to the arrays 132A–D and 134, a "no card" source/sensor pair 138 is arranged to provide a "card present" signal whenever a card is inserted into reader 110 so that the card intercepts the light passing between the source and sensor of pair 138.

In operation, as a card 112 is manually inserted into reader 110 from the direction 126, the row M+40, column 12 sensor of pair 139 provides aa control signal when the leading edge of card 112 passes that sensor. At this time, the sensor of pair 138 is sampled to determine if card 112 is intercepting the light passing from the source of pair 138. If so, the card reader 110 generates a WRONG SIDE signal indicating that the card 112 has been inserted with the wrong orientation. If the card does not intercept the light passing between the source and sensor of pair 138 at this time (due to the position of corner cut portion 122 of card 112), card reader 11 determines that the card 112 has been inserted with the correct orientation.

Following the determination that the card 112 is correctly oriented, as the card is further inserted into reader 110 so that the light from the group 1 source prevented by the leading edge of the card from reaching the group 1 sensor (indicating that the rows 1, 21, 41 and 61 are aligned with the column data detection arrays 132A–D), the 12 sensor elements of each of arrays 132A–D are sampled in parallel to detect and store signals indicative of the presence or absence of holes (representative of binary 1's or 0's, respectively) in the corresponding data locations in the rows 1, 21, 41 and 61 of data matrix 120. As the card continues to be inserted further into reader 110, the light passing from the group 2 source to its sensor in array 134 is intercepted by the leading edge of card 112 at the point where the rows 2, 22, 42 and 62 are aligned with the column sensor arrays 132A–D. The sensor elements of the column data detection arrays 132A–D are again sampled in parallel to detect and store signals indicative of the presence or absence of holes in the corresponding data locations in the rows 2, 22, 42 and 62 of data matrix 120. This operation continues successively for groups 3 through 20 of data matrix 120 as the card 112 is inserted farther into reader 110. In this manner, the rows of data matrix 120 of card 112 are successively read-in during the insertion of the card 112 into the reader 110 so that upon full insertion, the entire data matrix 120 stored on card 112 is read and stored in reader 110. The reader 110 detects when the card has been fully inserted and at such time generates a data ready signal indicative of the completion of the data storage operation.

FIG. 7 shows an exemplary configuration for the Hollerith card reader control logic for reading the card 112. The group 1–20 input lines are connected to the corresponding group data detection sensors in array 134 shown in FIG. 6, the row M column 1–12 lines are connected to the corresponding column data detection sensors in array 132A shown in FIG. 6, the row M+20 column 1–12 lines are connected to the corresponding column data detection sensors of array 132B, the row M+40 column 1–12 lines are connected to the corresponding column data detection sensors in array 132C, the row N+60 column 1-12 lines are connected to the corresponding column data detection sensors of array 132D, and the "no card" sensor line is connected to the sensor 138. In this embodiment, a hole in an inserted card which is between one of the above-mentioned sensors and its associated light source, or the absence of a card (permitting light to pass between the source and sensor) places a binary one on the associated line. When no light passes between a source and its associated sensor, a binary 0 is placed on the associated line.

In addition to the source/sensor pairs described above in conjunction with FIG. 6, the card reader 110 includes a random access memory 152, a group detect multiplexer 154, twenty state up-counter 156, a column detect multiplexer 158, a data decoder 159, a scan control 162, and status signal generator 164.

The up-counter 156 provides signals representative of its count state (Q1Q2Q4Q8Q16, which may range from count 1 to count 20) to the line select input of group detect multiplexer 154. The count state of up-counter 156 is representative of the group number of the current set of four rows of data matrix 120 which is aligned with the column data detection arrays 132A-D. The group detect line from multiplexer 154 provides to scan control 162 an input signal which has the same binary value as the group line which is selected by the count state of up-counter 156.

The scan control 162 provides signals on the M, M+20, M+40 and M+60 lines to the line select input of column detect multiplexer 158. In response to a signal applied on one of those lines, the associated one of the row M, row m+20, row M+40, and row M+60 sets of data input lines is effectively connected by the multiplexer 158 to the date decoder 159 via the column 1-12 detect lines. The decoder 159 applies signals to the data input of memory 152. The data decoder 159 may comprise s plurality of combinatorial logic gates for encoding the detected word appearing on the 12 line parallel input to decoder 159. For embodiments where the memory 152 is to store 80, 2 bit words in the same form in which they are encoded on the Hollerith card, decoder 159 is not used and the 12 detect lines from multiplexer 158 are connected directly to the data inputs of memory 152.

The status signal generator 164 is substantially the same as the generator 64 described in conjunction with FIG. 4, wherein a generator comprises three registers performing similar functions and generating the appropriate signals on the DATA READY, WRONG SIDE, PREPULLED lines 149A-C.

The scan control 162 also provides input signals to the READ, WRITE, and ADDRESS SELECT inputs of memory 152. Further, the scan control 162 may preset the contents of memory 152 to a predetermined state via an appropriate control signal applied to the RESET input to memory 152.

In operation, the external controller 14 may activate card reader 110 for reading a card by applying a clock signal on line 141 and a preset command signal on line 142. In response to the preset command signal, scan control 162 generates control signals which set the up-counter 156 to the count 1 state, load the memory 152 to a predetermined state (e.g. binary 1's at all locations), and reset the registers in status signal generator 164.

The card reader 110 is in a "NO CARD" state until a card 112 is inserted into reader 110 so that the leading edge passes the sensor element 139 of array 132C. At this time, scan control 162 determines the orientation of card 112 (from the control signals on the NO CARD and row M+40, column 12 lines). If the signal on the NO CARD line indicates that light is incident on the sensor of pair 138, and the signal from the row M+40, column 12 line indicates that no light is incident on the sensor of pair 139 (i.e., the row M+40, column 12 pair), then following the passage of the leading edge of card 112 beyond the group 1 sensor of array 134, scanner 162 maintains the card reader 110 in its operative state until the card is removed (whereupon reader 110 returns to the NO CARD state). Otherwise, scan control sets the wrong side register of generator 164 to provide a WRONG SIDE signal on line 149B and no reading operation occurs for the currently inserted card. up-counter For a correctly oriented card, as the leading edge passes the group 1 sensor of array 134, the group 1 line provides a binary 1 signal to the multiplexer 154. Since the up-counter 156 is in the count 1 state (as indicated above), the binary 1 on the group 1 input line to multiplexer 154 is transferred to the group detect line 154A and applied to scan control 162. This condition indicates to scan control 162 that the rows M, M+20, M+40, M+60 (where M equals 1, the count state of up-counter 156), of the data matrix 120 on the card 112 are aligned with the corresponding ones of the column data detection arrays 132A-D. At this time, a scan cycle is initiated by scan control 162.

In the scan cycle, the scan control 162 successively provides line select signals on the M, M+20, M+40 and M+60 lines to the column detect mutliplexer 158. In response to each line select signal, multiplexer 158 transfers the data in parallel from the 12 detector elements of the corresponding one of arrays 132A-D to the column 1-12 detect lines and thereupon to data decoder 159 and to the data input of memory 152. In synchronism with these line select input signals to multiplexer 158, the scan control 162 generates a corresponding sequence of address control signals to the address select input of memory 152 and also, a write command signal to the write input of memory 152. As a result, the data words from the Mth, M+20th, M+40th, and M+60th rows of matrix 120 are detected and stored in the corresponding locations of memory 152.

Following the write operation thereby initiated, scan control 162 increments the up-counter 156 to its next state, i.e. the count 2 state. Accordingly, the data input on the group 2 line to the multiplexer 154 is applied via the group detect line 154A to scan control 162. As the card 112 is inserted further into the card reader so that the leading edge intercepts the light passing from the group 2 source to the group 2 sensor, a corresponding signal is thereby applied via group detect line 154A to scan control 162. In response thereto, the above-described interrogation and write operation of the column data detection arrays 132A-D is initiated for the rows 2, 22, 42, and 62 (i.e. for $M=2$, rows M, M+20, M+40 and M+60) of the data matrix 120 of the card 112. As the card 112 is inserted further into the card reader, these operations are repeated for each of the groups 3 through 20 as the leading edge passes the corresponding group detection sensor of array 134.

Following the detection of the row 80 data of card 112, scan control 162 sets the data ready register of status signal generator 164 to provide a DATA READY signl on line 149A.

If the scan control 162 determines from the NO CARD line that the card 112 has been removed before the leading edge reaches the group 20 source/sensor pair (i.e. before counter 156 reaches the count state 20), then control 162 sets the prepulled register of generator 164 to provide a PREPULLED signal on line 149C.

Following the application of DATA READY signal on line 149A, the controller 14 may generate a transmit command signal on line 143. In response thereto, control 162 applies a control signal to the READ input of memory 152 to readout the contents of memory 152 on line 147. This latter operation may be performed as a sequence of 80 words on 12 parallel output lines (line 47) in the case where the memory 152 stores the data read from the card 112 in the form of a 12 × 80 bit data matrix.

It will be understood that the above-described embodiment for reading 12 × 80 bit data matrix on Hollerith encoded cards is merely exemplary and that other source/sensor arrangements may be utilized in keeping with the present invention. For example, the column data arrays may take the form of two 12 bit linear arrays spaced by the distance 40×D, with the group data detection array comprising a 40 element data detection array having elements spacing equal to D. In such a configuration, the number of detection elements, including the NO CARD pair, is equal to 65, as compared with the number 69 required for the configuration shown in FIG. 6.

However, the configuration of FIG. 6 provides an additional advantage over the latter alternative embodiment when utilized in a card reader for paper or "IBM type" cards. Using paper cards with the configuration of FIG. 6, the card is approximately ¾ of the way into the card reader 110 before the first rows of data are sensed by the column data detection arrays. Consequently, the guide means 128 and 129 provide a more accurate alignment function than compared with the alternative embodiment having two 12 bit column data detection arrays since, in that case, the card is only approximately halfway into the card reader before the first reading takes place.

In a case where the cards-to-be-read are plastic or some other rigid material in which there would be no problem of the bending of that material so as to cause an error in the reading, the alternative system with the two 12 bit column data array and 40 bit group data detection array may provide an advantageous system for card reading, in that fewer detection elements are required.

As a further alternative, a three 12 bit linear column data detection array with a 27 element group data detection array may be used to provide a card reading system having 64 source/sensor pairs (counting the NO CARD pair). However, any of these embodiments described above provide a substantial advantage in comparison with the card readers known in the art which presently provide at least 960 source/sensor pairs for detecting the presence or absence of data at each bit location in the data matrix of the card-to-be-read.

I claim:

1. Apparatus for reading the information stored on a card in a plurality of information positions forming a data matrix, said matrix having M rows by N columns with each information position being characterized by one of two states representing a binary zero or a binary 1, comprising,
   guide means for accepting a manually inserted card and guiding said card in a first direction along a predetermined path as said card is inserted in said guide means at an arbitrary speed,
   a first linear array of data detection elements extending in said first direction and positioned adjacent to said guide means, said elements being spaced apart in a fixed relation to the spacing between rows of information positions on said card, the number of said data detection elements being less than M,
   a second array of data detection elements having N columns comprising at least two spaced apart rows, each of said rows extending in a direction perpendicular to said first direction, said second array being positioned to underlie said matrix of information positions when said card is passed in a first direction along said guide means, said rows of detection elements being spaced apart in said first direction by a distance related to the spacing between said rows of information positions on said cards, and
   circuit means coupled to the elements of said first and second arrays and providing, as the leading edge of a card passes over each detection element in said first array at said arbitrary speed, that the detection elements of said second array are read out to provide output signals indicating the binary value of each information position for predetermined ones of the rows of said data matrix on said card overlying said second array.

2. Apparatus in accordance with claim 1 wherein the product of the number of data detection elements in said first array and the number of rows in said second array equals or is greater than M.

3. Apparatus in accordance with claim 1 wherein said rows of detection elements in said second array are spaced apart by a distance equal to the spacing between rows of information positions in said data matrix multiplied by the ratio of M to the number of rows in said second array.

4. Apparatus in accordance with claim 1 wherein $M = 80$, $N = 12$, the number of detection elements in said first array equals 20 and the number of rows in said second array equals 4.

5. Apparatus in accordance with claim 1 wherein said card includes a further information position outside said data matrix and wherein said apparatus includes
   a further data detection element positioned to underlie said further information position when the leading edge of said card overlies a predetermined detection element of one of said arrays when said card is inserted in a predetermined orientation, and
   circuit means providing a WRONG SIDE signal when the leading edge of said card ovrlies said predetermined detection element, and said further information position on said card fails to overlie said further data detection element.

6. Apparatus in accordance with claim 1 wherein said circuit means further includes row identification means for generating a signal for identifying times during the insertion of a card in said guide means when a previously unread group of rows of said data matrix overlies the detection elements of said second array.

7. Apparatus in accordance with claim 6 wherein said circuit means includes a first counter which is preset to a predetermined count state when no card is entered on said guide means and which is decremented from said predetermined count state by increments of one as the leading edge of said card passes over each of the data detection elements at said first array in one direction, and means responsive to each change of count state of said counter for sampling said data detection elements of said second array.

8. Apparatus in accordance with claim 1 wherein said circuit means includes a memory means having an addressed location associated with each of said N columns of said data matrix, and wherein said circuit means provides a sequence of signals to said memory for each information position of said data matrix at which a binary 1 is detected by the elements of said second array, each of said sequence of signals being stored at the specific address location within said memory corresponding to the column of said detected binary 1, such that after one of said cards has been fully passed along said guide means in said first direction with each of said rows of said data matrix having passed over at least one row of said array of column data detection elements, data signals representative of the binary state of each information position in said N column by M row data matrix is stored in said associated addressed location in said memory.

9. Apparatus in accordance with claim 8 wherein said circuit means further includes row identification means for generating a signal for identifying times during the insertion of a card in said guide means when a previously unread group of rows of said data matrix overlies the detection elements of said second array.

10. Apparatus in accordance with claim 9 wherein said circuit means includes a first counter which is preset to a predetermined count state when no card is entered on said guide means and which is decremented from said predetermined count state by increments of one as the leading edge of said card passes over each of said rows of data detection elements in one direction, and means responsive to each change of count state of said counter for sampling said column data detection elements.

11. Apparatus in accordance with claim 1 wherein said circuit means includes:
A. a decoding means, said decoding means being successively responsive to each of said rows of detection elements in said second array to generate a sequence of decoded signals, each sequence being representative of the information stored at the positions of said data matrix overlying one of said rows of said second array when the leading edge of a cord passes over a detection element in said first array, and
B. a memory means for storing each of said decoded signals, said memory means having an addressed location associated with each of said N rows of said data matrix, such that after one of said cards has been fully passed along said guide means in said first direction with each of said rows of said data matrix having passed over at least one row of said second array, a data signal representative of the information stored at each row of positions of said data matrix is stored in said associated location in said memory.

12. Apparatus in accordance with claim 11 wherein said circuit means further includes row identification means for generating a signal for identifying times during the insertion of a card in said guide means when a previously unread group of rows of said data matrix overlies the detection elements of said second array.

13. Apparatus in accordance with claim 12 wherein said circuit means includes a first counter which is preset to a predetermined count state when no card is entered on said guide means and which is decremented from said predetermined count state by increments of one as the leading edge of said card passes over each of said rows of data detection elements in one direction, and means responsive to each change of count state of said counter for sampling said column data detection elements.

14. Apparatus in accordance with claim 1 and further including circuit means for detecting when a card is present in said guide means, for for accumulating the total number of the data detection elements in said first array which have detected the leading edge of said card, and for providing a PREPULLED signal whenever said number fails to equal the total number of elements of said first array before said card is removed from said guide means.

15. In an apparatus for reading the information stored on a card in a plurality of information positions forming a data matrix, said matrix having M rows by N columns with each information position being characterized by one of two states representing a binary zero or a binary 1, said apparatus including:
A. guide means for accepting a manually inserted card and guiding said card in a first direction along a predetermined path as said card is inserted in said guide means at an arbitrary speed,
B. a first linear array of M row data detection elements extending in said first direction and positioned adjacent to said guide means for sensing the leading edge of said card as it is carried along said guide means in said first direction, and wherein the spacing of said row data detection elements is related to the spacing of the rows in said data matrix,
C. a second linear array of N column data detection elements perpendicular to said first array and positioned with respect to said guide means so that each of said column data detection elements detects the state of the correspondingly located information positioned in a row of said data matrix on said card as said row passes over said second array,
D. circuit means coupled to said first and second arrays and providing, as the leading edge of a card passes over each detection element in said first array at said arbitrary speed, that the detection elements of said second array are read out to provide output signals indicating for each column of said data matrix on said card the binary value for each information position in the related row of said data matrix, the improvement comprising:
a memory means having an addressed location associated with each of said N columns of said data matrix, and wherein said circuit means provides a sequence of signals to said memory for each information position of said data matrix at which a binary 1 is detected by the elements of said second array, each of said sequence of signals being stored at the specific address location within said memory corresponding to the column of said detected binary 1, such that after one of said cards has been fully passed along said guide means in said first direction with each of said rows of said data matrix having passed over said array of column data detection elements, data signals representative of the binary state of each information position in said N column by M row data matrix is stored in said associated addressed location in said memory.

16. Apparatus in accordance with claim 15 and further including circuit means for detecting when a card is present in said guide means, for accumulating the total number of said row data detection elements which detect the leading edge of said card and for providing a PREPULLED signal whenever said number fails to total M before said card is removed from said guide means.

17. Apparatus in accordance with claim 15 wherein said circuit means further includes row identification means for generating a signal for identifying times during the insertion of a card in said guide means when a previously unread row of said data matrix overlies the detection elements of said second array.

18. Apparatus in accordance with claim 17 wherein said circuit means includes a first counter which is preset to a predetermined count state when no card is entered in said guide means and which is decremented from said predetermined count state by increments of one as the leading edge of said card passes over each of said rows of data detection elements in one direction, and means responsive to each change of count state of said counter for sampling said column data detection elements.

19. Apparatus according to claim 15 wherein said card includes a further information position outside said data matrix positioned to overlie a first specific one of said row data detection elements when said card is entered along said guide means, and the leading end of said card overlies a second specific one of said row data detection elements and a specific row of said data matrix overlies said array of column data detection elements, and said circuit means provides a WRONG SIDE signal when the leading edge of said card overlies said second specific one of said row data detection elements, and said further information position fails to overlie said first specific one of said row data detection elements.

20. In an apparatus for reading the information stored on a card in a plurality of information positions forming a data matrix, said matrix having M rows by N columns with each information position being characterized by one of two states representing a binary zero or a binary 1, said apparatus including:

A. guide means for accepting a manually inserted card and guiding said card in a first direction along a predetermined path as said card is inserted in said guide means at an arbitrary speed, B. a first linear array of M row data detection elements extending in said first direction and positioned adjacent to said guide means for sensing the leading edge of said card as it is carried along said guide means in said first direction, and wherein the spacing of said row data detection elements is related to the spacing of the rows in said data matrix, C. a second linear array of N column data detection elements perpendicular to said first array and positioned with respect to said guide means so that each of said column data detection elements detects the state of the correspondingly located information positioned in a row of said data matrix on said card as said row passes over said second array, D. circuit means coupled to said first and second arrays and providing, as the leading edge of a card passes over each detection element in said first array at said arbitrary speed, that the detection elements of said second array are read out to provide output signals indicating for each column of said data matrix on said card the binary value for each information position in the related row of said data matrix, the improvement comprising:

i. a decoding means, said decoding means being successively responsive to each of said rows of detection elements in said second array to generate a sequence of decoded signals, each sequence being representative of the information stored at the positions of said data matrix overlying said second array when the leading edge of a card passes over a detection element in said first array, and ii. a memory means for storing each of said decoded signals, said memory means having an addressed location associated with each of said N rows of said data matrix, such that after one of said cards has been fully passed along said guide means in said first direction with each of said rows of said data matrix having passed over said second array, a data signal representative of the information stored at each row of positions of said data matrix is stored in said associated location in said memory.

21. Apparatus in accordance with claim 20 wherein said circuit means further includes row identification means for generating a signal for identifying times during the insertion of a card in said guide means when a previously unread row of said data matrix ovrlies the detection elements of said second array.

22. Apparataus in accordance with claim 21 wherein said circuit means includes a first counter which is preset to a predetermined count state when no card is entered on said guide means and which is decremented from said predetermined count state by increments of one as the leading edge of said card passes over each of said rows of data detection elements in one direction, and means responsive to each change of count state of said counter for sampling said column data detection elements.

23. Apparatus in accordance with claim 20 and further including circuit means for detecting when a card is present in said guide means, for accumulating the total number of said row data detection elements which detect the leading edge of said card and for providing a PREPULLED signal whenever said number fails to total M before said card is removed from said guide means.

24. Apparatus according to claim 20 wherein said card includes a further information position outside said data matrix positioned to overlie a first specific one of said row data detection elements when said card is entered along said guide means, and the leading end of said card overlies a second specific one of said row data detection elements and a specific row of said data matrix overlies said array of column data detection elements, and said circuit means provides a WRONG SIDE signal when the leading edge of said card overlies said second specific one of said row data detection elements, and said further information position fails to overlie said first specific one of said row data detection elements.

* * * * *

UNITED STATES PATENT OFFICE
CERTIFICATE OF CORRECTION

PATENT NO. : 3,961,160
DATED : June 1, 1976
INVENTOR(S) : Richard A. Gorgens

It is certified that error appears in the above-identified patent and that said Letters Patent are hereby corrected as shown below:

| | |
|---|---|
| Column 5, line 12: | Add quotes to --no badge--; |
| Column 6, line 12: | Add quotes to --1's--; |
| Column 6, line 16: | Add quotes to --no badge--; |
| Column 9, line 66: | "and M+60)" should read --and row M+60)--; |
| Column 10, line 24: | "11" should read --110--; |
| Column 10, line 35: | Add quotes to --1's or 0's--; |
| Column 11, line 35: | "to the date decoder" should read --to the data decoder--; |
| Column 11, line 64: | Add quotes to --1's--; |
| Column 12, line 17: | Following "currently inserted card." delete --upcounter--; |
| Column 15, line 52: | "cord" should read --card--; |
| Column 18, line 34: | "ovrlies" should read --overlies--. |

Signed and Sealed this

Fourteenth Day of September 1976

[SEAL]

Attest:

RUTH C. MASON
*Attesting Officer*

C. MARSHALL DANN
*Commissioner of Patents and Trademarks*